US008768892B2

(12) United States Patent
Myerson et al.

(10) Patent No.: US 8,768,892 B2
(45) Date of Patent: Jul. 1, 2014

(54) ANALYZING DATA AND PROVIDING RECOMMENDATIONS

(75) Inventors: Neal Robert Myerson, Seattle, WA (US); Darren C. Justus, Seattle, WA (US); Brian David Connolly, Seattle, WA (US); Vladimir Holostov, Hadera (IL)

(73) Assignee: Microsoft Corporation, Redmond, WA (US)

( * ) Notice: Subject to any disclaimer, the term of this patent is extended or adjusted under 35 U.S.C. 154(b) by 576 days.

(21) Appl. No.: 12/239,820

(22) Filed: Sep. 29, 2008

(65) Prior Publication Data

US 2010/0082512 A1    Apr. 1, 2010

(51) Int. Cl.
*G06F 17/00* (2006.01)
*G06F 7/00* (2006.01)

(52) U.S. Cl.
USPC ............................ 707/686; 707/776; 700/104

(58) Field of Classification Search
CPC .......... G06F 11/3466; G06F 17/30371; G06F 2201/86
USPC .................................. 707/686, 776; 700/104
See application file for complete search history.

(56) References Cited

U.S. PATENT DOCUMENTS

| | | | | |
|---|---|---|---|---|
| 5,862,333 A | * | 1/1999 | Graf | 709/223 |
| 5,923,850 A | * | 7/1999 | Barroux | 709/224 |
| 6,101,540 A | * | 8/2000 | Graf | 709/224 |
| 6,118,447 A | * | 9/2000 | Harel | 717/131 |
| 6,212,581 B1 | * | 4/2001 | Graf | 710/18 |
| 6,220,768 B1 | * | 4/2001 | Barroux | 709/224 |
| 6,343,236 B1 | * | 1/2002 | Gibson et al. | 700/79 |
| 6,345,239 B1 | * | 2/2002 | Bowman-Amuah | 703/6 |
| 6,412,026 B1 | * | 6/2002 | Graf | 710/18 |
| 6,484,155 B1 | * | 11/2002 | Kiss et al. | 706/46 |
| 6,609,083 B2 | | 8/2003 | Enck et al. | |
| 6,614,882 B1 | * | 9/2003 | Beamon et al. | 379/27.01 |
| 6,651,034 B1 | * | 11/2003 | Hedlund et al. | 702/183 |
| 6,681,344 B1 | * | 1/2004 | Andrew | 714/38.14 |
| 6,766,165 B2 | * | 7/2004 | Sharma et al. | 455/423 |
| 6,988,134 B2 | * | 1/2006 | Thorpe et al. | 709/223 |
| 6,990,178 B2 | * | 1/2006 | Beamon | 379/9.03 |
| 7,003,560 B1 | * | 2/2006 | Mullen et al. | 709/223 |
| 7,079,010 B2 | | 7/2006 | Champlin | |
| 7,099,727 B2 | * | 8/2006 | Wu et al. | 700/104 |
| 7,111,059 B1 | | 9/2006 | Garcea et al. | |
| 7,162,390 B2 | | 1/2007 | Jowett et al. | |
| 7,197,576 B1 | * | 3/2007 | Lo et al. | 710/2 |

(Continued)

OTHER PUBLICATIONS

"An on-demand solution for IT Performance Management", Retrieved on Jul. 28, 2008, 1 page. http://www.metricus.com/.

(Continued)

*Primary Examiner* — Pavan Mamillapalli
(74) *Attorney, Agent, or Firm* — Louise Bowman; David Andrews; Micky Minhas (57) ABSTRACT

Aspects of the subject matter described herein relate to analyzing data and providing recommendations regarding computing assets. In aspects, data is collected from computing assets and aggregated in a data repository. A data analyzer analyzes the data to determine problems associated with the computing assets. Work done to identify a problem with one computing asset may be used to identify problems with or provide recommendations for other computing assets controlled by the same or different entities. When a problem is identified in a computing asset, a recommendation may be proactively provided to an entity associated with the computing asset.

20 Claims, 5 Drawing Sheets

(56) References Cited

U.S. PATENT DOCUMENTS

| | | | |
|---|---|---|---|
| 7,280,640 B2* | 10/2007 | Beamon | 379/9.02 |
| 7,353,265 B2* | 4/2008 | Gopalkrishnan et al. | 709/224 |
| 7,376,969 B1* | 5/2008 | Njemanze et al. | 726/22 |
| 7,512,580 B2* | 3/2009 | Ronnewinkel | 706/52 |
| 7,526,508 B2* | 4/2009 | Tan et al. | 707/999.002 |
| 7,617,251 B2* | 11/2009 | Blumenau et al. | 707/999.001 |
| 7,685,083 B2* | 3/2010 | Fairweather | 706/45 |
| 2002/0059188 A1* | 5/2002 | Nomura et al. | 707/1 |
| 2004/0088386 A1* | 5/2004 | Aggarwal | 709/220 |
| 2005/0086195 A1* | 4/2005 | Tan et al. | 707/1 |
| 2005/0102322 A1* | 5/2005 | Bagley et al. | 707/104.1 |
| 2005/0262237 A1 | 11/2005 | Fulton et al. | |
| 2006/0047793 A1* | 3/2006 | Agrawal et al. | 709/221 |
| 2006/0224254 A1* | 10/2006 | Rumi et al. | 700/28 |
| 2007/0027985 A1 | 2/2007 | Ramany et al. | |
| 2007/0112712 A1* | 5/2007 | Flinn et al. | 706/45 |
| 2007/0112714 A1* | 5/2007 | Fairweather | 706/46 |
| 2007/0198609 A1* | 8/2007 | Black et al. | 707/204 |
| 2008/0162688 A1* | 7/2008 | Reumann et al. | 709/224 |
| 2008/0313121 A1* | 12/2008 | Yan | 706/47 |

OTHER PUBLICATIONS

"NetIQ Analysis Center", Retrieved on Jul. 28, 2008, 2 pages. http://www.netiq.com/products/nac/default.asp.

"Unicenter Service Metric Analysis r11.1", Product Brief: Unicenter Service Metric Analysis, 2007, 5 pages.

"Microsoft Exchange Server Analyzer Retrospective", Microsoft Corporation, Topic last modified on Feb. 13, 2006, 3 pages. http://technet.microsoft.com/en-us/library/aa996037(printer).aspx.

* cited by examiner

ANALYZING DATA AND PROVIDING RECOMMENDATIONS

BACKGROUND

In a company, there may be many computing assets that are configured in various ways. These computing assets may be spread throughout an organization. Configurations that are ideal for a large company are often not ideal for a smaller company. Furthermore, configurations that may be legal in one country may not be legal in another county.

One or more system administrators may be employed to manage these computing assets. The system administrators may be IT generalists who are not specialists on any particular product that runs on the computing assets. The system administrators may also have other competing job responsibilities other than maintaining the computing assets.

With many software products having many configuration options, managing, configuring, and maintaining these computing assets may be beyond the knowledge, time, or other resources available of most system administrators. Rather than hiring more system administrators or throwing more resources at maintaining the computing assets, companies want better solutions.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

Briefly, aspects of the subject matter described herein relate to analyzing data and providing recommendations regarding computing assets. In aspects, data is collected from computing assets and aggregated in a data repository. A data analyzer analyzes the data to determine problems associated with the computing assets. Work done to identify a problem with one computing asset may be used to identify problems with other computing assets controlled by the same or different entities. When a problem is identified in a computing asset, a recommendation may be proactively provided to an entity associated with the computing asset.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" is to be read as "at least one aspect." Identifying aspects of the subject matter described in the Detailed Description is not intended to identify key or essential features of the claimed subject matter.

The aspects described above and other aspects of the subject matter described herein are illustrated by way of example and not limited in the accompanying figures in which like reference numerals indicate similar elements and in which:

DETAILED DESCRIPTION

Definitions

As used herein, the term "includes" and its variants are to be read as open-ended terms that mean "includes, but is not limited to." The term "or" is to be read as "and/or" unless the context clearly dictates otherwise. Other definitions, explicit and implicit, may be included below.

Exemplary Operating Environment

Figure 1:
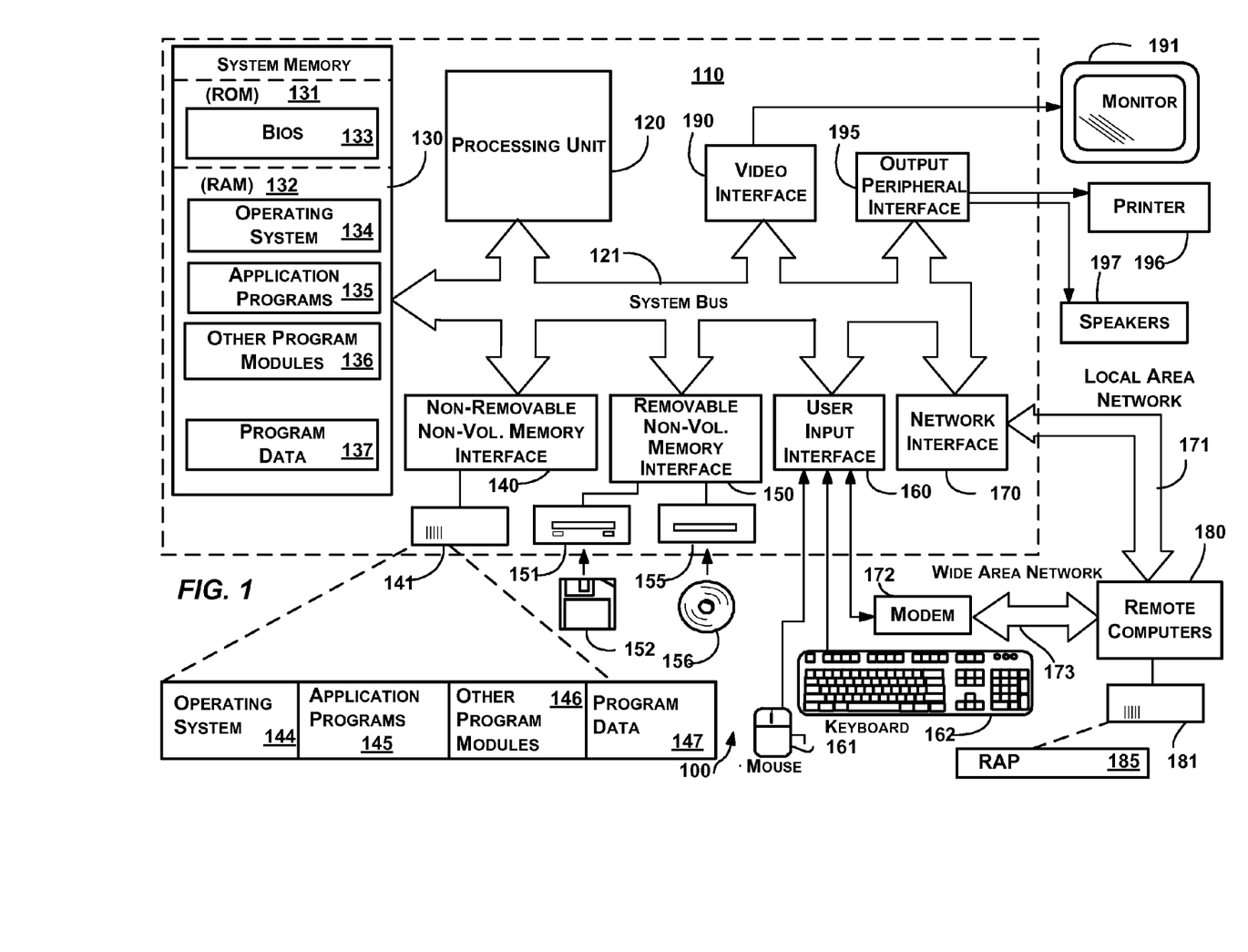
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well known computing systems, environments, or configurations that may be suitable for use with aspects of the subject matter described herein comprise personal computers, server computers, hand-held or laptop devices, multiprocessor systems, microcontroller-based systems, set top boxes, programmable consumer electronics, network PCs, minicomputers, mainframe computers, personal digital assistants (PDAs), gaming devices, printers, appliances including set-top, media center, or other appliances, automobile-embedded or attached computing devices, other mobile devices, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. A computer may include any electronic device that is capable of executing an instruction. Components of the computer 110 may include a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, Peripheral Component Interconnect Extended (PCI-X) bus, Advanced Graphics Port (AGP), and PCI express (PCIe).

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media.

Computer storage media includes both volatile and nonvolatile, removable and non-removable media implemented in any method or technology for storage of information such as computer-readable instructions, data structures, program modules, or other data. Computer storage media includes RAM, ROM, EEPROM, flash memory or other memory technology, CD-ROM, digital versatile discs (DVDs) or other optical disk storage, magnetic cassettes, magnetic tape, magnetic disk storage or other magnetic storage devices, or any other medium which can be used to store the desired information and which can be accessed by the computer 110.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include magnetic tape cassettes, flash memory cards, digital versatile discs, other optical discs, digital video tape, solid state RAM, solid state ROM, and the like. The hard disk drive 141 is typically connected to the system bus 121 through a non-removable memory interface such as interface 140, and magnetic disk drive 151 and optical disc drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies.

A user may enter commands and information into the computer 20 through input devices such as a keyboard 162 and pointing device 161, commonly referred to as a mouse, trackball, or touch pad. Other input devices (not shown) may include a microphone, joystick, game pad, satellite dish, scanner, a touch-sensitive screen, a writing tablet, or the like. These and other input devices are often connected to the processing unit 120 through a user input interface 160 that is coupled to the system bus, but may be connected by other interface and bus structures, such as a parallel port, game port or a universal serial bus (USB).

A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 may include a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Analyzing Data and Providing Recommendations

As mentioned previously, a company may have many computers that are configured in a variety of ways. The company may employ one or more system administrators to manage, configure, and maintain these computers. System administrators may not have the knowledge, time, or other resources to perform these functions.

Figure 2:
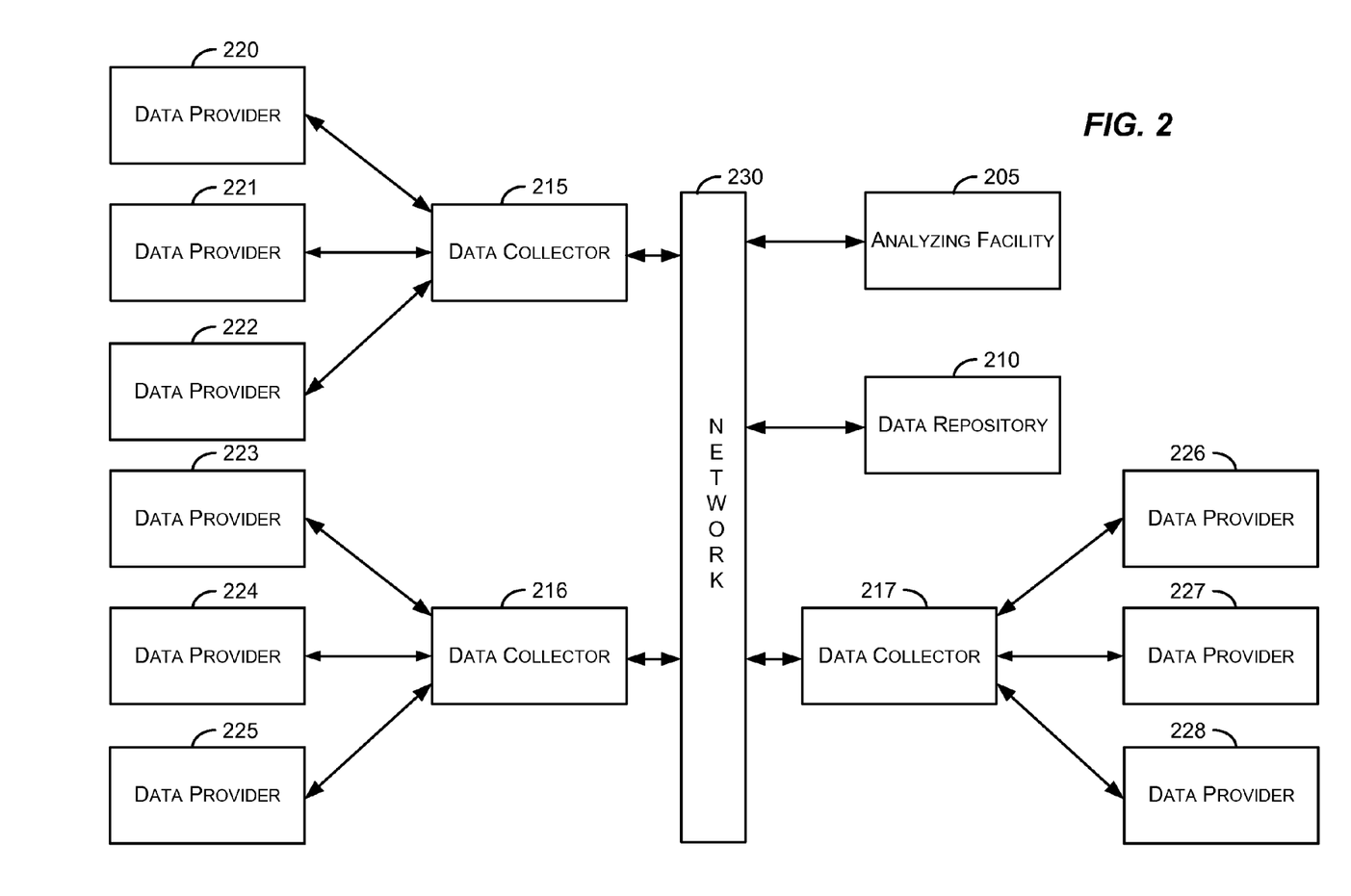
FIG. 2 is a block diagram representing an exemplary environment in which aspects of the subject matter described herein may be implemented.

FIG. 2 is a block diagram representing an exemplary environment in which aspects of the subject matter described herein may be implemented. The environment includes an analyzing facility 205, a data repository 210, data collectors 215-217, data providers 220-228, and a network 230 and may include other entities (not shown).

A data provider is any component that is capable of providing data to a data collector. As used herein, the term component is to be read to include all or a portion of a device, one or more software components executing on one or more devices, some combination of one or more software components and one or more devices, and the like.

A data provider may obtain information that is used to derive data from a computing asset. Deriving data may include extracting, summarizing, copying, or otherwise processing the information to obtain the data. In one embodiment, a data provider may send "raw" data to a data collector. In such an embodiment, the data provider may be a lightweight component that sends data it obtains without changes to the data collector.

As one example, a data provider may comprise a database or component thereof that provides data to a data collector. As another example, a data provider may comprise a process that provides data to a data collector. The term "process" and its variants as used herein may include one or more traditional processes, threads, components, libraries, objects that perform tasks, and the like. A process may be implemented in hardware, software, or a combination of hardware and software. In an embodiment, a process is any mechanism, however called, capable of or used in performing an action. A process may be distributed over multiple devices or a single device. In one embodiment, an entity comprises a process as defined above. In another embodiment, an entity comprises any one or more objects that is/are capable of performing actions associated with or using or one or more processes.

A data provider may obtain data from a SQL data source, a computing asset configuration manager, a computing asset operation manager, a directory service, an e-mail application, other applications, other data sources, and the like.

A data provider may comprise a user interface that allows a user to fill out a questionnaire. Data from the questionnaire may then be sent to a data collector.

A data provider may provide data regarding the type, configuration, utilization, performance, capacity, location, and the like of a computing asset. The data may include finer-grained information such as city, country, state, and address, industry, Internet access or other company policies, bandwidth available for various purposes, patching practices, and the like. As used herein, a computing asset may include hardware, software, user accounts, a combination of the above, and the like.

The data providers 220-222 may reside at one customer site, the data providers 223-225 may reside at another customer site, and the data providers 226-228 may reside at yet another customer site. The customer sites may be at different locations of a single organization or may be at different organizations.

In one embodiment, one or more data providers may reside on the same device as the one or more data collectors to which they provide data. In another embodiment, one or more data providers may reside on a different device than the device upon which the one or more data collectors reside to which they provide data. In some embodiments, where a data collector resides on the same device as its associated data provider, the data collector and the data provider may be combined such that the data collector may replace or perform the functions of the data provider.

The data collectors 215-217 send data to the data repository 210. In one embodiment, a data collector may extract, summarize, or otherwise process the data it receives from data providers before providing data to the data repository 210. In another embodiment, a data collector may forward the data it receives from data providers to the data repository 210 without processing the data.

One or more of the data collectors 215-217 may be updated dynamically to collect data that is to be analyzed and presented for a given entity. In one embodiment, a data collector may execute code to obtain data from various data providers. The code executed by a data collector may be based at least in part on entity input and system-defined parameters.

The data repository 210 may comprise one or more devices upon which data may be stored and from which the data may later be retrieved. The data repository 210 may comprise a file system, database, volatile memory such as RAM, other storage, some combination of the above, and the like and may be distributed across multiple devices.

The data repository 210 may comprise a data store that is capable of storing data in a structured format. Such repositories may include, for example, relational databases, object oriented databases, hierarchical database, HTML files, XML files, spreadsheets, flat files, and other repositories.

Data from the data repository 210 may be accessed via a database management system (DBMS). A DBMS may comprise one or more programs that control organization, storage, management, and retrieval of data of the data repository 210. A DBMS may receive requests to access data in the data repository and may perform the operations needed to provide this access. Access as used herein may include reading data, writing data, deleting data, updating data, a combination including one or more of the above, and the like.

The data repository 210 may be stored off-premise from premises controlled by entities associated with the data providers 220-228. In one embodiment, off-premise indicates that the data repository 210 resides in a facility that is independent of the entities. In another embodiment, off-premise indicates that the data repository resides in a different local area network than the data providers.

The data repository 210 may be used to quickly obtain computing asset data in response to an entity's request for help. A score card of various features of an entity's computing assets may be maintained and updated on the data repository 210 so that it is available upon demand in order to assist the entity. Recommendations (described below) for computing assets for various entities may also be stored and maintained on the data repository 210 so that they too are available upon demand.

The data collectors 215-217 may communicate with the data repository 210 via the network 230. In an embodiment, the network 230 may comprise the Internet.

The analyzing facility 205 may comprise one or more components that are capable of analyzing data stored in the data repository 210. The analyzing facility 205 may be collocated on a device hosting the data repository 210 or may be distributed on one or more devices external to the data repository. An exemplary system including various components that may be used at an analyzing facility is described in more detail in conjunction with FIG. 3.

Although the three sites, nine data providers, three data collectors, a data repository, an analyzing facility, and a network in various configurations, it will be recognized that more, fewer, or a different combination of these and other entities may be employed without departing from the spirit or scope of aspects of the subject matter described herein. Furthermore, the entities and communication networks included in the environment may be configured in a variety of ways as will be understood by those skilled in the art without departing from the spirit or scope of aspects of the subject matter described herein.

Figure 3:
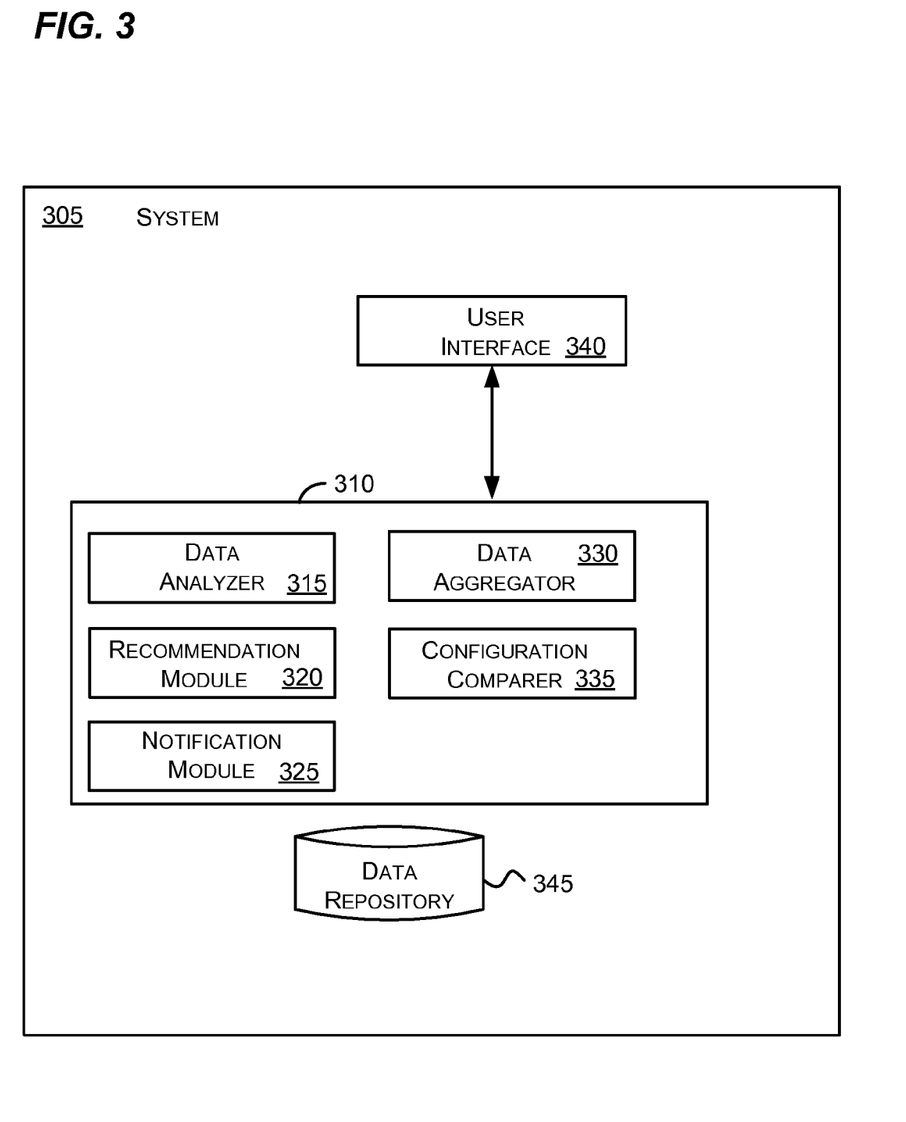
FIG. 3 is a block diagram that includes an exemplary system that may be used in analyzing data in accordance with aspects of the subject matter described herein.

FIG. 3 is a block diagram that includes an exemplary system that may be used in analyzing data in accordance with aspects of the subject matter described herein. The system 305 may include components 310, a user interface 340, and a data repository 345. The components may include a data analyzer 315, a recommendation module 320, a notification module 325, a data aggregator 330, and a configuration comparer 335.

The system 305 may be implemented on or as one or more computers (e.g., the computer 110 as described in conjunction with FIG. 1).

The data repository 345 corresponds to the data repository 210 of FIG. 2. The data repository may be located on a device that hosts one or more of the components 310 or may be located on a device external to any device that hosts one or more of the components 310.

The data analyzer 315 operates to examine aggregated data stored in the data repository 345 and to identify, using the aggregated data, one or more computing assets, if any, that have a problem. The data analyzer 315 may also create and maintain score cards of various features of an entity's computing assets. In analyzing data, the data analyzer 315 may first work with a specific portion of the data stored in the data repository 345. This may happen, for example, in response to a customer requesting help with a problem the customer is experiencing with one or more of its computing assets.

A problem may exist if a computing asset is configured in a manner that violates a law. For example, some countries may have laws against exported data out of the country. As another example, some countries may have laws against inspecting certain data streams (e.g., e-mail, Web browsing, secure connections to the Internet, and so forth).

A problem may relate to an industry guideline, industry standard, company standard, best practice, or the like. For example, a software component may not be configured according to best practice.

A problem may, but does not necessarily imply, that a computing asset is malfunctioning. For example, a problem may include that a computing asset is not functioning at its optimal level, that it is not configured in accordance with best practices, industry standards, or company standards, that the computing asset is consuming more power than necessary, that the asset is vulnerable to a security threat, or the like. The above examples of problems are not intended to be all-inclusive or exhaustive. Based on the teachings herein, those skilled in the art may recognize many other problems of computing assets that may be addressed by aspects of the subject matter described herein.

By examining the portion of the aggregated data in the data repository 345, the root of the problem may be identified manually, semi-automatically, or fully automatically. After the root of the problem has been identified, code may be created that is capable of automatically detecting the problem in other portions of the aggregated data stored in the data repository 345. Code may comprise rules, programming language constructs, actions, or the like that may be taken to detect the problem in the aggregated data. This code may be received by the system 305 and placed in or otherwise associated with the data analyzer 315. The code may then be executed against data in the data repository 345 to determine other computing assets, if any, that have the problem.

The other computing assets that have the problem may be controlled by the same or different entities than the entity that controls the computing asset in which the problem was first found. In this way, work that is done to identify the problem for one computing asset may be leveraged to identify the problem in other computing assets.

The recommendation module 320 may operate to determine a recommendation that indicates an action to take to address the problem found by the data analyzer 315. An action may include one or more actions and may involve reconfiguring, reinstalling, upgrading, downgrading, patching, other actions, and the like of one or more computing assets. Where the problem relates to a law, the action may comprise a configuration action that will bring a computing asset into compliance with laws associated with a country. Where the problem relates to an industry guideline, standard, best practice, or the like, the action may comprise a configuration action that will bring the asset into compliance with the industry guideline, standard, best practice, or the like.

The recommendation module 320 may leverage data in the data repository 345 to create a recommendation based on knowledge of configurations used by other customers (i.e., entities) matching the same profile (e.g., use, company size, country, location, other characteristics or properties, and the like) as the computing asset to which the recommendation is sent. In one embodiment, best practices may be obtained from configurations and operations of computing assets and may be shared with other customers as a recommendation via the recommendation module 320.

A recommendation may include or be associated with a configuration file or code that, if applied or executed may perform the action indicated by the recommendation. This may make it easier, for example, for a system administrator to follow the recommendation.

A recommendation may also include or be associated with a document that indicates best practices, industry guidelines, industry standards, a security message regarding a vulnerability of a computing asset, and the like. Best practices may be tailored to a particular customer's profile. A best practices document or configuration file may be dynamically generated based on properties of the customer to which a recommendation is sent. A best practice document or configuration file may be created from experience with other similarly-situated customers. When a customer receives the recommendation, the customer may also access the document to receive additional information.

The notification module 325 is operable to proactively provide the recommendation to entities associated with computing assets that have the problem. In proactively providing the recommendation, the notification module 325 may not wait for an entity to request assistance with respect to the problem for a particular computing asset. For example, the notification module 325 may provide the recommendation for the particular computing asset prior to the entity requesting assistance with respect to the problem. For example, when a problem is detected, the notification module 325 may automatically send a message such as an e-mail to the entity. In another embodiment, in providing proactive notification, the notification module 325 may also provide notification of a recommendation after an entity has requested assistance with respect to the problem or another problem associated with a computing asset.

In providing a recommendation, the notification module 325 may also distribute or provide a link to a document that indicates best practices, industry guidelines, industry standards, a security message regarding a vulnerability of a computing asset, and the like.

The data aggregator 330 may be operable to aggregate data derived from a plurality of computing assets. The data relates to operation of the computing assets and may include, for example, type, configuration, utilization, performance, capacity, location, and other information about a computing asset.

The configuration comparer 335 may provide information that compares features of a computing asset with features of another similarly-purposed computing asset. Features may include, for example, hardware, software, configuration, performance, utilization, other information about the computing asset, and the like. The computing asset, the entity controlling the asset, and other information may be excluded by the configuration comparer 335 to make the information anonymous. Similarly-purposed computing assets may comprise computing assets that have similar features (e.g., software installed, number of requests handled, number of users, hardware components, etc.). The idea is to compare "apples to apples" rather than comparing a very powerful computing asset having heavy demand to a relatively non-powerful computing asset having light demand. Similarly-purposed computing assets may comprise computing assets that are used in a particular industry, by certain-sized organizations, or other computing assets that have similar characteristics.

The configuration comparer 335 may provide comparison via the use of a Web page, customized application, or the like. Using this mechanism, entities may be given access to view these comparisons and may thereby see how their computing assets compare with other similarly-purposed computing assets.

The user interface 340 may display information from the components 310 and may receive input related to this information. The user interface 340 may allow a system administrator or the like to interact with the components 310. In one embodiment, the user interface 340 may comprise a Web or other graphical interface that is viewable from a device other than a device that hosts the components 310. In another embodiment, the user interface 340 may comprise a graphical interface associated with a display of a device that hosts the components 310.

Figure 4:
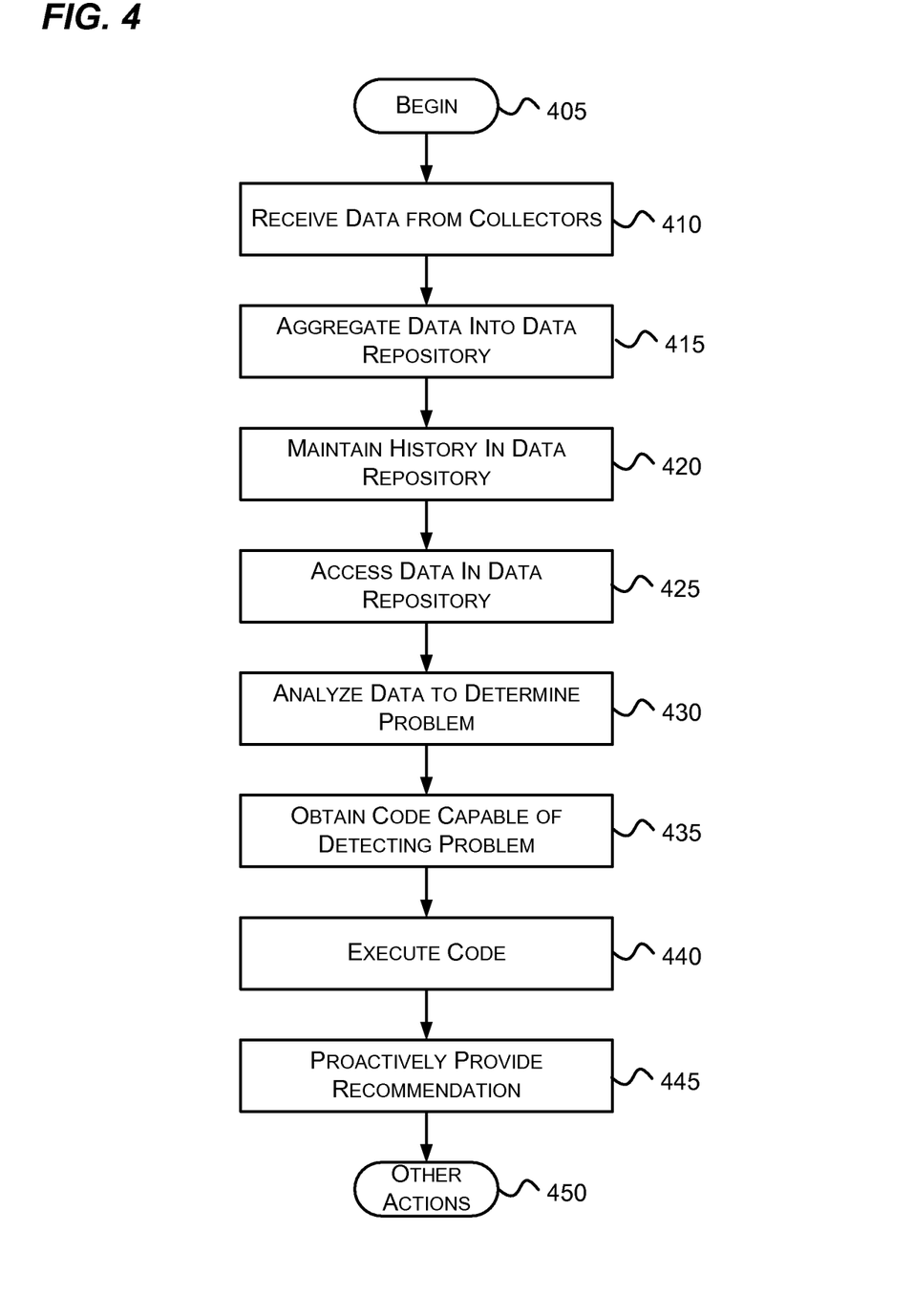
FIGS. 4-5 are flow diagrams that generally represent exemplary actions that may occur in accordance with aspects of the subject matter described herein.
Figure 5:
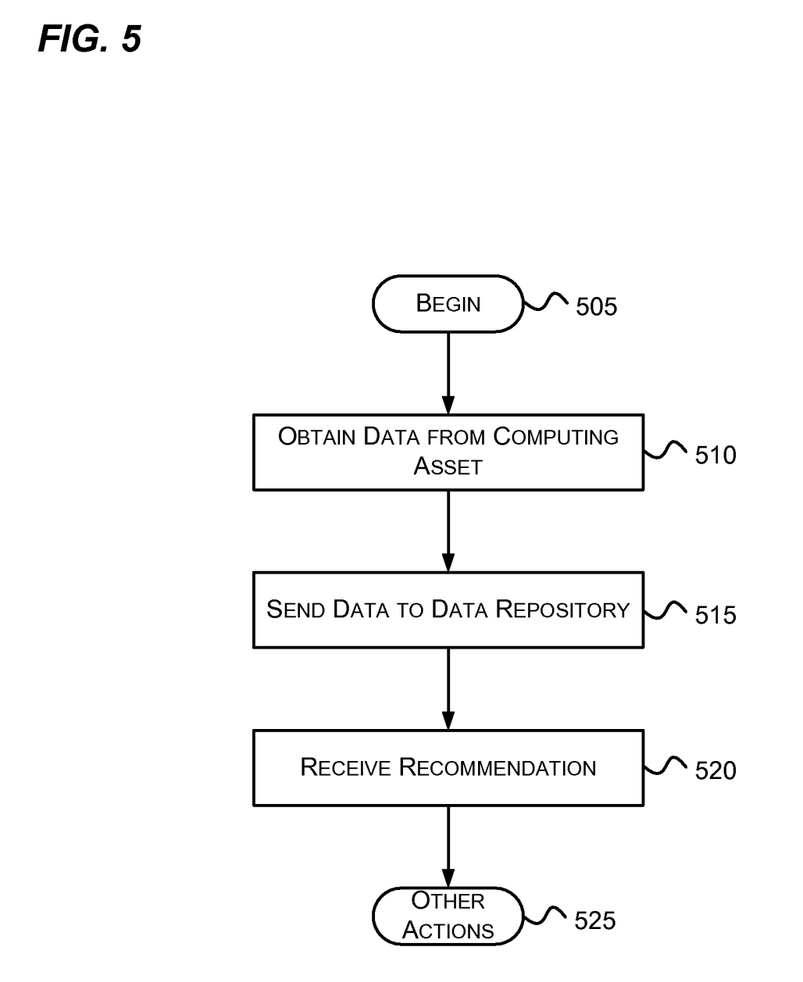

FIGS. 4-5 are flow diagrams that generally represent exemplary actions that may occur in accordance with aspects of the subject matter described herein. For simplicity of explanation, the methodology described in conjunction with FIG. 4-5 is depicted and described as a series of acts. It is to be understood and appreciated that aspects of the subject matter described herein are not limited by the acts illustrated and/or by the order of acts. In one embodiment, the acts occur in an order as described below. In other embodiments, however, the acts may occur in parallel, in another order, and/or with other acts not presented and described herein. Furthermore, not all illustrated acts may be required to implement the methodology in accordance with aspects of the subject matter described herein. In addition, those skilled in the art will understand and appreciate that the methodology could alternatively be represented as a series of interrelated states via a state diagram or as events.

Turning to FIG. 4, at block 405, the actions begin. At block 410, data is received from data collectors that receive the data from the data providers. For example, referring to FIG. 2, data is received at the data repository 210 from the data collector 215 that receives the data from the data providers 220-222.

At block 415, the data is aggregated into a data repository. For example, referring to FIG. 3, the aggregator 330 aggregates (e.g., combines, extracts, summarizes, derives other data from, and the like) the received data with other data in the data repository 345.

At block 420, history of previously-received data is maintained in the data repository. For example, referring to FIG. 3, older data received from a data collector is maintained in the data repository 345. This older data may be used to determine trends, spot problems, determine if recommendations have been followed, and the like.

At block 425, data in the repository is accessed. For example, referring to FIG. 3, the data analyzer 315 accesses data in the data repository.

At block 430, the data is analyzed to determine a recommendation to provide for a problem experienced by a computer asset. For example, referring to FIG. 3, the data analyzer 315 scans through data in the data repository 345. The data analyzer 315 scans the data to data associated with a computing asset to determine a recommendation to provide to an entity associated with the computing asset. As another example, the data analyzer 315 may be assisted by a human troubleshooter to determine characteristics of the problem and a recommendation to address the problem.

At block 435, code is received that is capable of detecting the problem, if it exists, elsewhere in the aggregated data. For example, referring to FIG. 3, code is developed that is capable of detecting the problem in data associated with other computing assets included in the data repository. This code is integrated into the data analyzer 315.

At block 440, the code is executed to detect a computing asset that has the problem. For example, referring to FIG. 3, the data analyzer 315 executes the code which scans through the data repository 345 to determine other computing assets if any that have the problem.

At block 445, a recommendation is proactively provided to an entity associated with the computing asset. For example, referring to FIG. 2, an e-mail is sent to an entity that controls the computing assets associated with the data provider 224. The e-mail provides a recommendation regarding computing assets in which the problem was detected.

At block 450, other actions, if any, are performed.

Turning to FIG. 5, at block 505, the actions begin. At block 510, data is obtained from a computing asset. For example, referring to FIG. 2, the data provider 226 obtains data from a computing asset (not shown).

At block 515, data is sent to a data repository. For example, referring to FIG. 2, the data provider 226 provides the data it obtained to the data collector 217. The data collector passes the data changed or unchanged as desired to the data repository 210.

At block 520, a recommendation relating to a problem the computing asset is received. For example, referring to FIG. 2, an entity associated with the data provider 226 receives a recommendation. The recommendation indicates an action to address the problem. The problem may have been identified at least in part by analyzing other data associated with another computing asset and generating (e.g., writing) code to identify the problem in data aggregated at the data repository 210.

In one embodiment, an entity receiving a recommendation may indicate whether and how a recommendation is to be applied. For example, an entity may indicate that the entity simply wants to receive the recommendation. As another example, the entity may indicate that the entity wants to receive the recommendation together with a prompt that allows the entity to "accept" the action indicated by the recommendation. If the entity accepts the action, a configuration file may be applied or code executed that performs the action associated with the recommendation. As yet another example, an entity may indicate that the entity wants to automatically apply all or a certain class of recommendations. In this case, when the entity receives the recommendation, a configuration file may be applied or code executed that performs the action associated with the recommendation.

At block 525, other actions, if any, are performed.

As can be seen from the foregoing detailed description, aspects have been described related to analyzing data and providing recommendations. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A method implemented at least in part by a computer, the method comprising:
    accessing data stored in a data repository, the data related to at least first and second computing assets, the data derived from a plurality of data providers associated with the computing assets, the data aggregated in the data repository;
    analyzing a first portion of the data to determine a recommendation to provide to a first entity associated with a first data provider, the recommendation related to a problem the first computing asset associated with the first entity is experiencing;
    receiving code that is capable of detecting the problem, if it exists, in further computing assets having data stored in the data repository, the data including a second portion of the data received from a second data provider;
    executing the code to determine that the second computing asset has the problem, said executing including scanning the data stored in the data repository with the received code; and
    proactively providing the recommendation to an entity associated with the second computing asset prior to the entity requesting assistance with respect to the problem by sending a message to the entity if the problem is found using the second portion of the data received from the second data provider, the message including or referencing a configuration file to apply to the second computing asset to apply the recommendation.

2. The method of claim 1, further comprising:
    receiving the data from a plurality of data collectors that receive the data from the data providers;
    aggregating the data into the data repository; and
    maintaining a history of previously-received data in the data repository.

3. The method of claim 1, wherein the data repository is hosted off-premise from premises controlled by entities associated with the data providers.

4. The method of claim 1, wherein the recommendation comprises a configuration action to take on a computing asset to address the problem.

5. The method of claim 1, wherein the data comprises country information that indicates a country associated with a computing asset and wherein the recommendation comprises a configuration action that will bring a computing asset into compliance with laws associated with the country.

6. The method of claim 1, wherein the data comprises configuration information associated with a computing asset.

7. The method of claim 1, wherein the data comprises performance information associated with a computing asset.

8. The method of claim 1, further comprising providing a comparison of features of similarly-purposed computing assets.

9. In a computing environment, a system, comprising:
    a data aggregator operable to aggregate data derived from a plurality of data providers, the data related to operation of computing assets, the plurality of data providers obtaining information used to derive the data from the computing assets;
    a data repository operable to store aggregated data from the data aggregator and to provide access to the aggregated data, the data repository being off-premise from at least one of the data providers;
    a data analyzer implemented in a computer operable to examine the aggregated data and to identify, using the aggregated data, a computing asset, if any, that has a problem;
    a recommendation module operable to determine a recommendation that indicates an action to take to address the problem; and
    a notification module operable to proactively provide the recommendation to an entity associated with the computing asset prior to the entity requesting assistance with respect to the problem;
    the data analyzer receiving code that is generated in response to identifying that the computing asset has the problem and is capable of automatically detecting the problem, if it exists, in further of the computing assets having data stored in the data repository.

10. The system of claim 9, wherein the notification module being operable to proactively provide the recommendation to an entity associated with the computing asset, comprises the notification module being operable to provide the recommendation prior to the entity requesting assistance with respect to the problem for the computing asset.

11. The system of claim 9, wherein the data repository resides on an apparatus that hosts the recommendation module.

12. The system of claim 9, wherein the recommendation module is further operable to leverage data in the data repository related to other computing assets to determine the recommendation based on a profile of the computing asset, the other computing assets having the profile.

13. The system of claim 9, wherein the problem relates to the computing asset violating a law of a country in which the computing asset resides.

14. The system of claim 9, wherein the problem relates to a configuration of the computing asset.

15. The system of claim 9, wherein the problem relates to a performance of the computing asset.

16. The system of claim 9, further comprising a configuration comparer that provides a comparison of features of similarly-purposed computer assets.

17. The system of claim 9, wherein the notification module is operable to proactively provide the recommendation to another entity associated with at least one of the further of the computing assets by automatically sending a message to the other entity if the problem is found using a portion of the aggregated data received from a data provider associated with the at least one of the further of the computing assets, the message including or referencing a configuration file to apply to the at least one of the further of the computing assets to apply the recommendation.

18. A computer storage medium having computer-executable instructions, which when executed perform actions, comprising:
   obtaining data regarding a first computing asset, the data regarding the first computing asset related to an operation of the first computing asset;
   sending data to a data repository, the data sent to the data repository derived from the data regarding the first computing asset, the data repository aggregating data from a plurality of computing assets, the data repository and the first computing asset being on different networks; and
   receiving a recommendation relating to a problem of the first computing asset prior to assistance being requested with respect to the problem of the first computing device, the recommendation indicating an action to address the problem, the problem identified at least in part by analyzing data associated with a second computing asset and generating code to identify the problem in data aggregated at the data repository.

19. The computer storage medium of claim 18, wherein the data sent to the data repository comprises the data regarding the first computing asset.

20. The computer storage medium of claim 18, further comprising:
   extracting the data sent to the data repository from the data regarding the first computing asset.

* * * * *